United States Patent
Lee et al.

(10) Patent No.: US 8,654,665 B2
(45) Date of Patent: Feb. 18, 2014

(54) MOBILE TERMINAL AND HANDOVER METHOD OF THE MOBILE TERMINAL

(75) Inventors: Jung-Ryun Lee, Seoul (KR); Hyun-Sik Kang, Daejeon (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 237 days.

(21) Appl. No.: 13/113,371

(22) Filed: May 23, 2011

(65) Prior Publication Data

US 2012/0069751 A1 Mar. 22, 2012

(30) Foreign Application Priority Data

Sep. 22, 2010 (KR) ........................ 10-2010-0088277

(51) Int. Cl.
*H04W 72/10* (2009.01)
*H04W 36/30* (2009.01)

(52) U.S. Cl.
CPC .............. *H04W 72/10* (2013.01); *H04W 36/30* (2013.01)
USPC ....................................................... 370/252

(58) Field of Classification Search
USPC .................................. 455/436–440; 370/331
See application file for complete search history.

(56) References Cited

U.S. PATENT DOCUMENTS

| | | | |
|---|---|---|---|
| 2008/0069050 A1* | 3/2008 | Dutta et al. | 370/331 |
| 2009/0268807 A1* | 10/2009 | Krishnaswamy et al. | 375/240.01 |
| 2010/0234042 A1* | 9/2010 | Chan et al. | 455/453 |
| 2010/0246673 A1* | 9/2010 | Tanaka et al. | 375/240.12 |
| 2011/0044288 A1* | 2/2011 | Nagasawa et al. | 370/331 |

FOREIGN PATENT DOCUMENTS

KR 2001-0053494 6/2001

* cited by examiner

*Primary Examiner* — Huy D Vu
*Assistant Examiner* — Bao G Nguyen
(74) *Attorney, Agent, or Firm* — Edwards Wildman Palmer LLP

(57) ABSTRACT

A mobile terminal and a handover method for the mobile terminal are disclosed. A mobile terminal according to an embodiment of the invention may include: a communication unit configured to receive from a base station multiple frames, each belonging to one of two or more frame in a set order of priority; and a control unit configured to control the mobile terminal to perform a handover to a base station based on the occurrence pattern of frame types of the multiple frames.

10 Claims, 8 Drawing Sheets

MOBILE TERMINAL AND HANDOVER METHOD OF THE MOBILE TERMINAL

CROSS-REFERENCE TO RELATED APPLICATION

This application claims the benefit of Korea Patent Application No. 10-2010-0088277 filed Sep. 22, 2010, the entire contents of which application is incorporated by reference herein.

TECHNICAL FIELD

Embodiments of the present invention relate to a mobile terminal and a handover method for the mobile terminal, more particularly to a mobile terminal and a handover method for the mobile terminal that can minimize data loss during a handover.

BACKGROUND ART

A handover refers to a technique that allows a moving terminal (mobile terminal) to continue its current data communication when it moves out of the cell area of one base station and enters the cell area of another base station.

In other words, as illustrated in FIG. 1, when a mobile terminal 130 moves out of the cell area of a first base station 110, with which a data communication is currently taking place, and enters the cell area of an adjacent second base station 120, the mobile terminal 130 may perform a handover from the first base station 110 to the second base station 120 for seamless data communication.

Handovers can be divided mainly into horizontal handovers (or homogeneous handovers), performed when a mobile terminal moves across networks of the same type, to which the same technology is applied, and vertical handovers (or heterogeneous handovers), performed when a mobile terminal capable of multiple accesses (multiple interfaces) moves across access networks of different types, to which different technology is applied. For example, a vertical handover may be performed when a mobile terminal moves between a WiBro network and a WLAN network, a WLAN network and a CDMA network, or between a 3G network and a WLAN network.

In the case of a vertical handover between access networks of different types, in particular, service disruption may occur during the process of starting communication with a base station according to mutually different access technologies, creating a risk of data loss. However, conventional methods of performing vertical handovers focus mainly on improving the accuracy of handover decisions, such as by mitigating the ping-pong effect, and thus may face difficulties in guaranteeing the QoS (quality of service).

SUMMARY OF THE DISCLOSURE

To resolve the problem addressed above, an aspect of the invention provides a mobile terminal and a handover method for the mobile terminal that can minimize data loss during a handover.

Other purposes of the present invention can be derived through the embodiments below by those skilled in the related art.

To achieve the objective above, an embodiment of the invention provides a mobile terminal comprising a communication unit configured to receive multiple frames, each belonging to one of two or more frame types in a set order of priority; and a control unit configured to control the mobile terminal to perform a handover to a base station based on a pattern of frame type of the multiple frames.

The handover can include a process during which frame transmission/reception between the base station and the mobile terminal is interrupted, and the control unit can control the performance of the handover by delaying a time point for performing the frame transmission/reception interruption process for a designated time period.

The control unit can predict the time point at which a highest priority frame belonging to a highest priority frame type out of the multiple frames will be received, and can set the designated time period such that the highest priority frame is not received during the frame transmission/reception interruption process, based on the predicted time point at which the highest priority frame will be received.

Also, the handover can include a pre-registration operation, a detachment/attachment operation, and a re-registration operation and the control unit can provide control such that the detachment/attachment operation is performed after the pre-registration operation is completed and a designated time period has passed based on the pattern of the frame type.

The control unit can predict the time point of receiving the highest priority frame belonging to the highest priority frame type out of the multiple frames after the time point at which the pre-registration operation is completed, predict the time interval during which frame transmission/reception between the base station and the mobile terminal will be interrupted due to the handover being performed, and can set the designated time period, based on the time point at which the pre-registration operation is completed, the time point at which the highest priority frame will be received after the time point at which the pre-registration operation is completed, and/or the time interval during which the frame transmission/reception is interrupted.

For a case of the detachment/attachment operation starting immediately after the pre-registration operation is completed, the control unit computes a first probability for receiving the highest priority frame before the detachment/attachment operation is completed; for a case of the detachment/attachment operation starting at a time point prior to the point of receiving the highest priority frame at an interval tantamount to the time interval of the interruption of the frame transmission/reception, it computes a second probability for receiving the highest priority frame before the detachment/attachment operation is completed; and it sets the designated time period based on which of the first probability and the second probability is greater.

In the case of the first probability being less than or equal to the second probability, the control unit can set the designated time period according to the formula below:

$$T_w = t_f + T - t_{pre} - T_k$$

Here, $T_w$ stands for the designated time period, $t_f$ stands for a time interval between a reference time point and the time point of receiving the highest priority frame, $T$ stands for a time cycle of receiving the highest priority frame predicted, based on the occurrence pattern of the frame types, $t_{pre}$ stands for a time interval between the reference time point and an end point of the pre-registration operation, and $T_k$ stands for the time interval during which frame transmission is interrupted.

In the case of the first probability being greater than the second probability, the control unit can set the designated time period according to the formula below:

$$T_w = t_f + 2T - t_{pre} - T_k$$

Here, $T_w$ stands for the designated time period, $t_f$ stands for a time interval between a reference time point and the time point of receiving the highest priority frame, T stands for a time cycle of receiving the highest priority frame predicted based on the occurrence pattern of the frame type, $t_{pre}$ stands for a time interval between the reference time point and an end point of the pre-registration operation, and $T_k$ stands for the time interval during which frame transmission is interrupted.

The control unit can predict a reception cycle of the highest priority frame based on the pattern of the frame type, and can predict the time point at which the highest priority frame will be received after the time point at which the pre-registration operation is completed by using the time point at which the highest priority frame is received before the time point at which the pre-registration operation is completed and the reception cycle of the highest priority frame.

The multiple frames may include an I frame, a P frame, and a B frame, comprising video data, and the highest priority frame may correspond to the I frame.

Another embodiment of the invention provides a handover method for a mobile terminal that includes: measuring reception strength of data received from the base station—which data include multiple frames, each belonging to one of two or more frame types in a set order of priority—; and controlling the mobile terminal to perform a handover to the base station based on the occurrence pattern of the frame types of the multiple frames.

According to the present invention, data loss occurring during a handover may be minimized.

DETAILED DESCRIPTION OF THE DISCLOSURE

Certain embodiments of the invention will be described below in more detail with reference to the accompanying drawings. However, this is not intended to limit or restrict the present invention to particular modes of practice. In describing the drawings, like numerals are used to refer to like elements.

Figure 1:
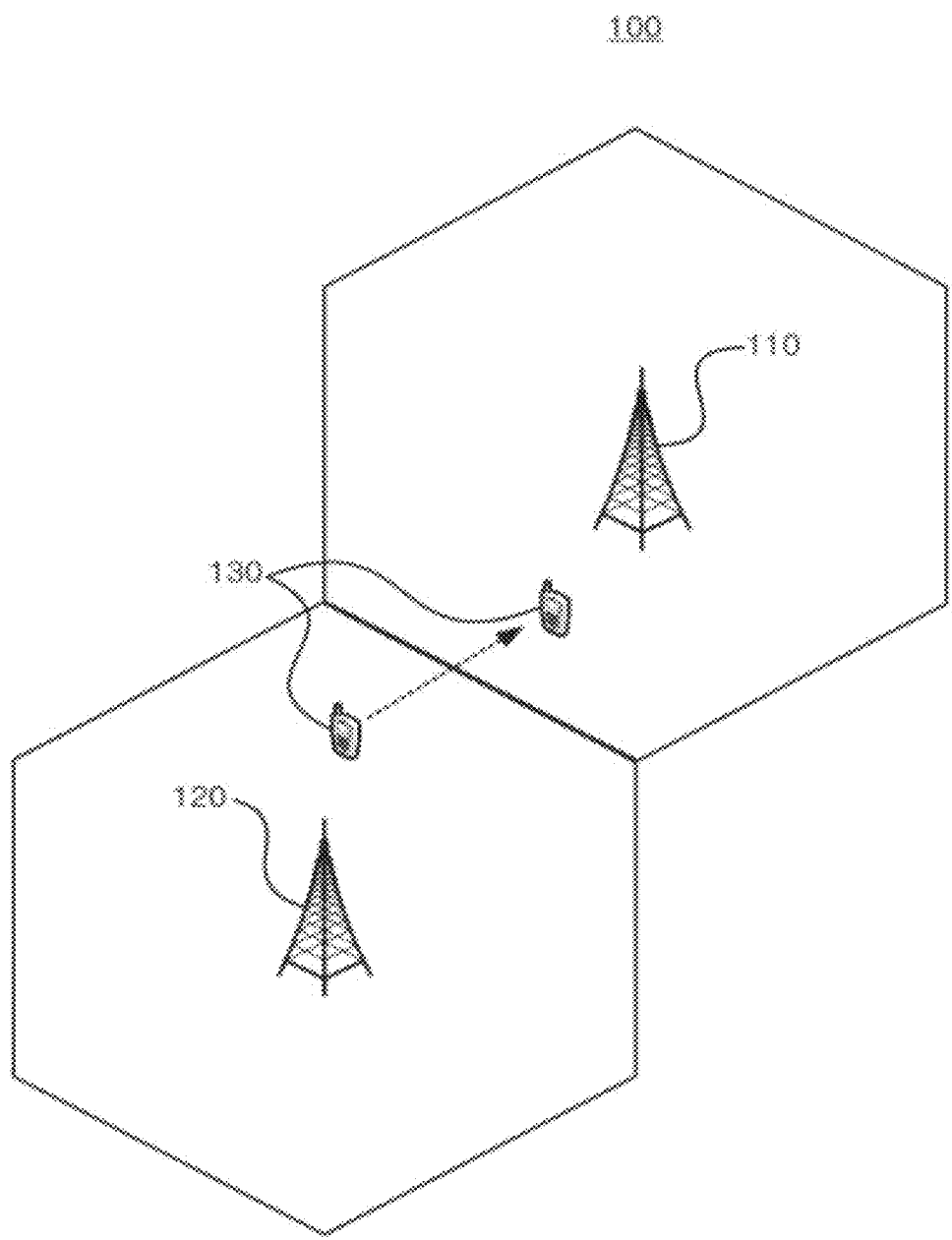
FIG. 1 schematically illustrates a communication system according to the related art.
Figure 2:
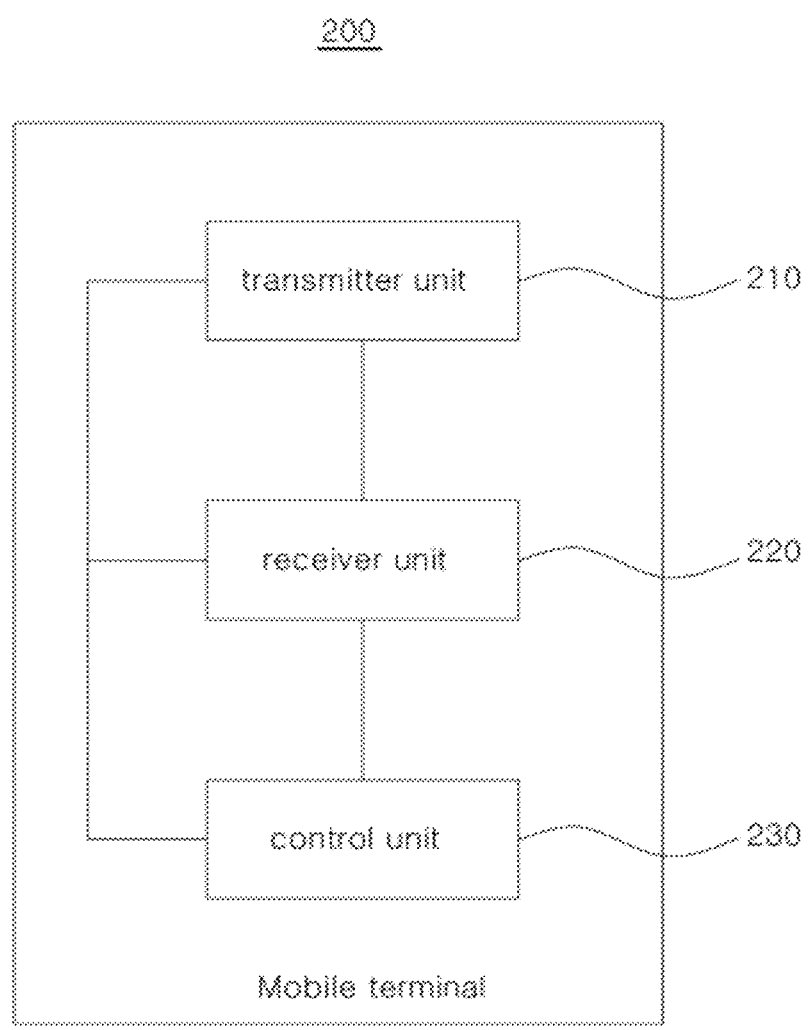
FIG. 2 is a block diagram illustrating the composition of a mobile terminal according to an embodiment of the invention.

FIG. 2 is a block diagram illustrating the composition of a mobile terminal according to an embodiment of the invention.

Referring to FIG. 2, a mobile terminal 200 according to an embodiment of the invention may include a transmitter unit 210, a receiver unit 220, and a control unit 230. A detailed description will be provided as follows on the function of each element.

While it is not illustrated in FIG. 2, it will be assumed that the mobile terminal 200 is moving into a cell area of a base station and performing a handover to the base station.

The transmitter unit 210 and receiver unit 220 may exchange data with the base station. That is, the transmitter unit 210 may transmit uplink data to the base station, and the receiver unit 220 may receive downlink data from the base station.

Here, downlink data received through the receiver unit 220 include multiple frames, each belonging to one of two or more frame types in a set order of priority. Here, the order of priority may signify the degree of importance as regards the effect of each frame type at the time of decoding the downlink data received.

As an example, the downlink data may be video data including an I frame (Intra-coded frame), a P frame (Predictive-coded frame), and a B frame (Bidirectional-coded frame).

An I frame is an independent type of frame, able to encode independently without referring to other frames (images), and used as the starting point of resynchronization in the case of received bit-stream being lost. A P frame is used for predictions between frames, and encoding is done with reference to the previous I frame and P frame. A B frame is a frame encoded with reference to the previous I frame and P frame as well as the later I frame and P frame.

In other words, as a B frame or a P frame is encoded with reference to the previous I frame and P frame, a loss of the previous I frame or P frame may lead to loss of the entire frame, causing the quality of video to fall. However, as a B frame has no frame with reference to itself, even if a loss should occur, there would be no loss to the entire frame.

Consequently, in the case of downlink data being video data, frame types may be given a priority order of "I frame, P frame, B frame."

The control unit 230 may control the mobile terminal 200 such that the mobile terminal 200 performs a handover to a base station based on the occurrence pattern of frame type for the multiple frames.

Figure 3:
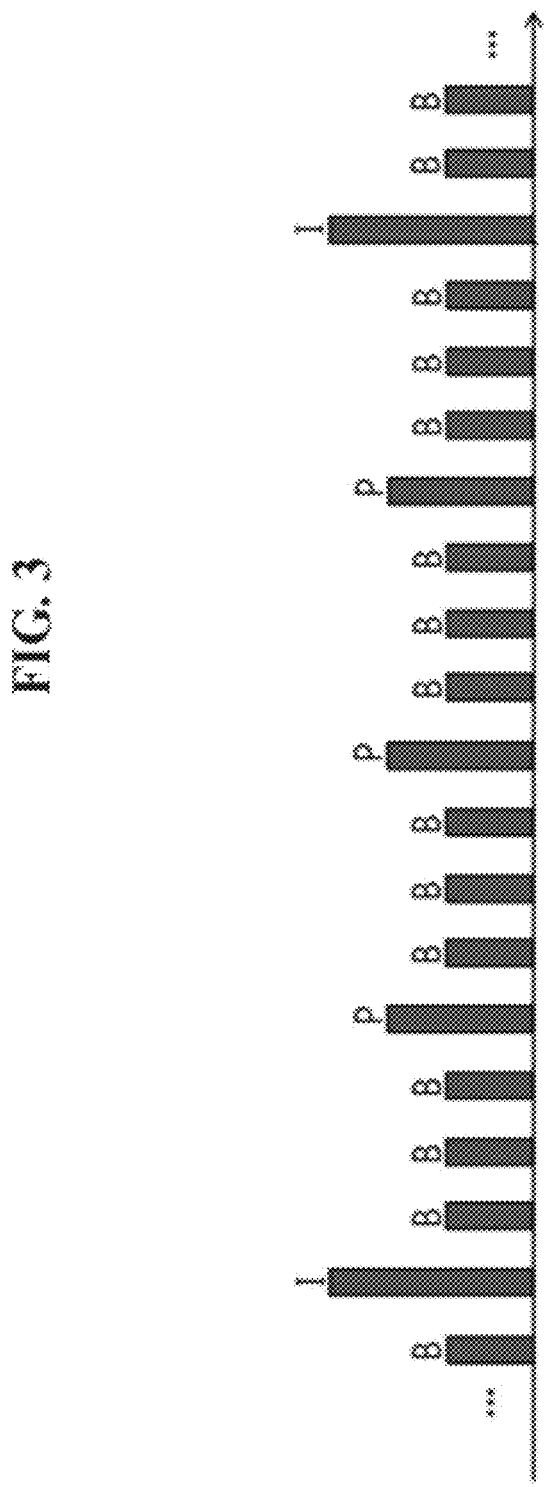
FIG. 3 is a drawing illustrating an example of video data including an I frame, a P frame, and a B frame.

As an example, in the case of received data being video data, the frames included in the video data (i.e. frames having one of the three frame types, I frame, P frame or B frame) occurs repeatedly according to a pattern (GOP structure; group of pictures) as illustrated in FIG. 3, and the control unit 230 controls a handover of the mobile terminal 200 based on such occurrence patterns of frame type of the multiple frames.

In more detail, at the time of performing a handover, there occurs a period during which transmission/reception of frames between a base station and the mobile terminal 200 is interrupted (in other words, service is disrupted); however, according to an embodiment of the present invention, the control unit 230 control performance of a handover in such a manner that the starting point for the process of interrupting frame transmission/reception is delayed for a designated time period, based on the occurrence pattern of frame type. This is to prevent a loss of the high priority frame.

Examining this in more detail, in the case of a request for a handover occurring and several processes for a handover proceeding in succession, if the time point at which a high priority frame is received comes within the process during which the frame transmission/reception is interrupted, the high priority frame may be lost. If the high priority frame is lost in this manner, several problems may occur when received entire data are decoded by the mobile terminal 200 (such as decrease in quality of the decoded data or occurrence of an error).

Figure 4:
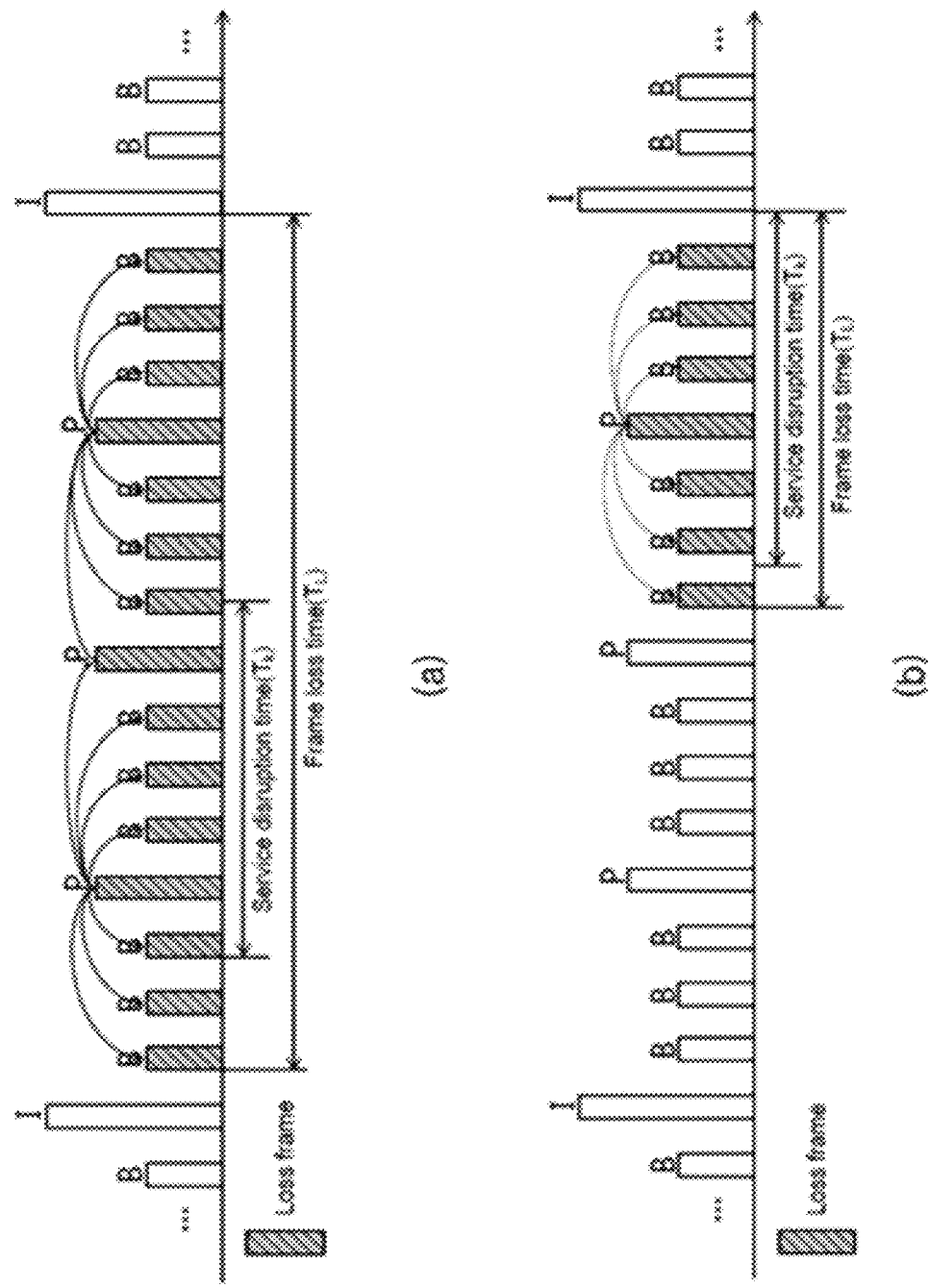
FIG. 4 is a drawing illustrating examples of data loss which may occur in receiving video data such as illustrated in FIG. 3.

For example, while the mobile terminal 200 is receiving video data such as illustrated in FIG. 3, if there occurs a process during which frame transmission/reception is interrupted (service disruption time) in the earlier part of GOP as illustrated in FIG. 4 (*a*), all data within GOP are lost (frame loss time) according to the referencing relationship between frame types. But, if service disruption time occurs in the latter part of GOP as illustrated in FIG. 4 (*b*), only some of the frames received in the latter part of GOP are lost.

Consequently, the mobile terminal 200 according to an embodiment of the present invention can minimize cases of high priority frames being received during frame transmission/reception interruption time by delaying the starting point of frame transmission/reception interruption time during the designated time period. Accordingly, overall loss of the entire frames may be reduced.

According to an embodiment of the present invention, the control unit 230 predicts the time point at which the highest priority frame belonging to the highest priority frame type is received (subsequent to the present time point), and based on the predicted time point for frame reception, may set the designated time period so that the highest priority frame is not received during frame transmission/reception interruption time. Accordingly, the probability of the loss of the frame having the highest priority frame type is reduced, thus improving the quality of data decoded from the received data, and minimizing the probability of errors occurring during decoding.

Also, according to an embodiment of the present invention, a handover performed by the mobile terminal 200 may be a vertical handover or a horizontal handover. That is, the handover method according to an embodiment of the present invention may be applied to both when the mobile terminal 200 moves across networks of the same type and when it moves across networks of different types.

A detailed explanation is presented below with reference to FIG. 5 as regards an embodiment whereby the mobile terminal 200 according to an embodiment of the present invention performs a handover to a base station, based on the occurrence pattern of frame type of multiple frames.

Figure 5:
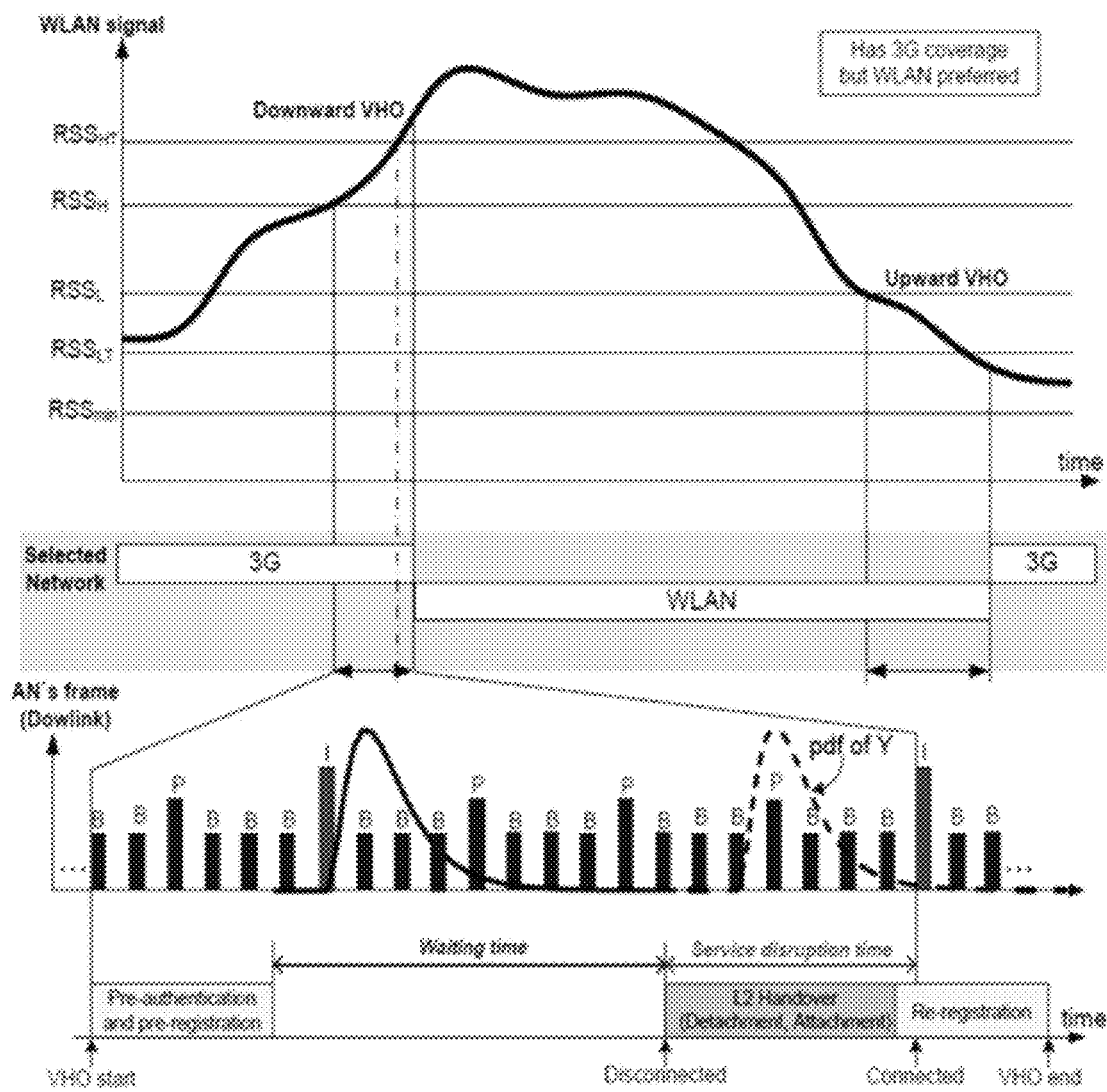
FIG. 5 is a drawing explaining a vertical handover performed in the case of a mobile terminal moving between a 3G network and a WLAN network, according to an embodiment of the present invention.

FIG. 5 is a drawing explaining a vertical handover performed in the case of the mobile terminal 200 moving between a 3G network and a WLAN network, according to an embodiment of the present invention.

In FIG. 5, explanation will be given on the assumption that downlink data sent from a base station are video data having the GOP structure, and that, among the multiple frame types, the frame with the highest priority is the I frame.

Referring to the graph illustrated in the upper part of FIG. 5, the mobile terminal 200 is located within the 3G network in the early part, and receives WLAN signals from the adjacent WLAN network simultaneously while receiving 3G signals from the 3G network.

Subsequently, the mobile terminal 200 moves from the 3G network to the WLAN network, and accordingly the RSS (Received Signal Strength) of the WLAN signals progressively becomes greater. If the RSS of the WLAN signals becomes greater than the predetermined critical strength $RSS_H$, a vertical handover toward the WLAN network (downward VHO) begins to be performed. In this case, the mobile terminal 200 analyzes the video data included in the WLAN signals received, thereby analyzing the occurrence pattern (GOP structure) of frame types of multiple traffics.

At this time, the vertical handover process can include a pre-registration operation, a detachment/attachment operation for disconnecting from the 3G network and connecting to the WLAN network, and a re-registration operation, as indicated in the less part of FIG. 5. In this case, the frame transmission/reception interruption process (service disruption time) explained above may include the entirety of the detachment/attachment operation and an early part of the re-registration operation, as indicated in the less part of FIG. 5. Hereinafter, the time during which frame transmission/reception is interrupted will be referred to as "service disruption time" for the sake of ease of explanation.

Based on the information above, a more detailed explanation for a vertical handover performed by the mobile terminal 200 is presented below.

First, once a vertical handover toward the WLAN network (downward VHO) starts (VHO start), the control unit 230 performs the pre-registration operation toward the WLAN network.

After completing the pre-registration operation, the control unit 230 performs the detachment/attachment operation based on the occurrence pattern of frames within the analyzed downlink data.

Explaining this in more detail, the control unit 230 may control the handover of the mobile terminal 200 so that the detachment/attachment operation is performed after the pre-registration operation is completed and the designated time period (i.e. waiting time) has passed, based on the frame occurrence pattern of the multiple frames included in the downlink data. (Hereinafter, the designated time period will be referred to as "waiting time" for the sake of ease of explanation.)

According to an embodiment of the present invention, the control unit 230 predicts a time point at which the I frame is received after the pre-registration operation is completed (i.e. the point at which the next I frame is received), then predicts a service disruption time for performing the handover, and sets a waiting time based on the time point at which the pre-registration operation is completed, the time point at which the next I frame is received after the pre-registration operation is completed, and/or the predicted service disruption time.

At this time, the control unit 230 predicts the reception cycle of the I frame (i.e. GOP structure cycle) based on the occurrence pattern of frame types, and by using the time point at which the I frame is received before the pre-registration operation is completed (i.e. the point at which the current I frame is received) as well as the reception cycle of the I frame, can predict a time point at which the next I frame is received after the pre-registration operation is completed. Also, the control unit 230 can predict a service disruption time at the present time point based on the statistics of service disruption times.

In more detail, according to an embodiment of the present invention, in the case of the detachment/attachment operation starting immediately after the pre-registration operation is completed (that is, the detachment/attachment operation starting without a waiting time), the control unit 230 can compute the probability of the next I frame being received before the detachment/attachment operation is completed (a first probability); in the case of the detachment/attachment operation starting at a time point prior to the point of reception of the next I frame at a distance equal to the service disruption time, it can compute the probability of the next I frame being received before the detachment/attachment operation is completed (a second probability); and sets a waiting time based on which of the first probability and the second probability is greater. Here, the first and second probabilities may be indicated as an area on a PDF (Probability Density Function).

Figure 6:
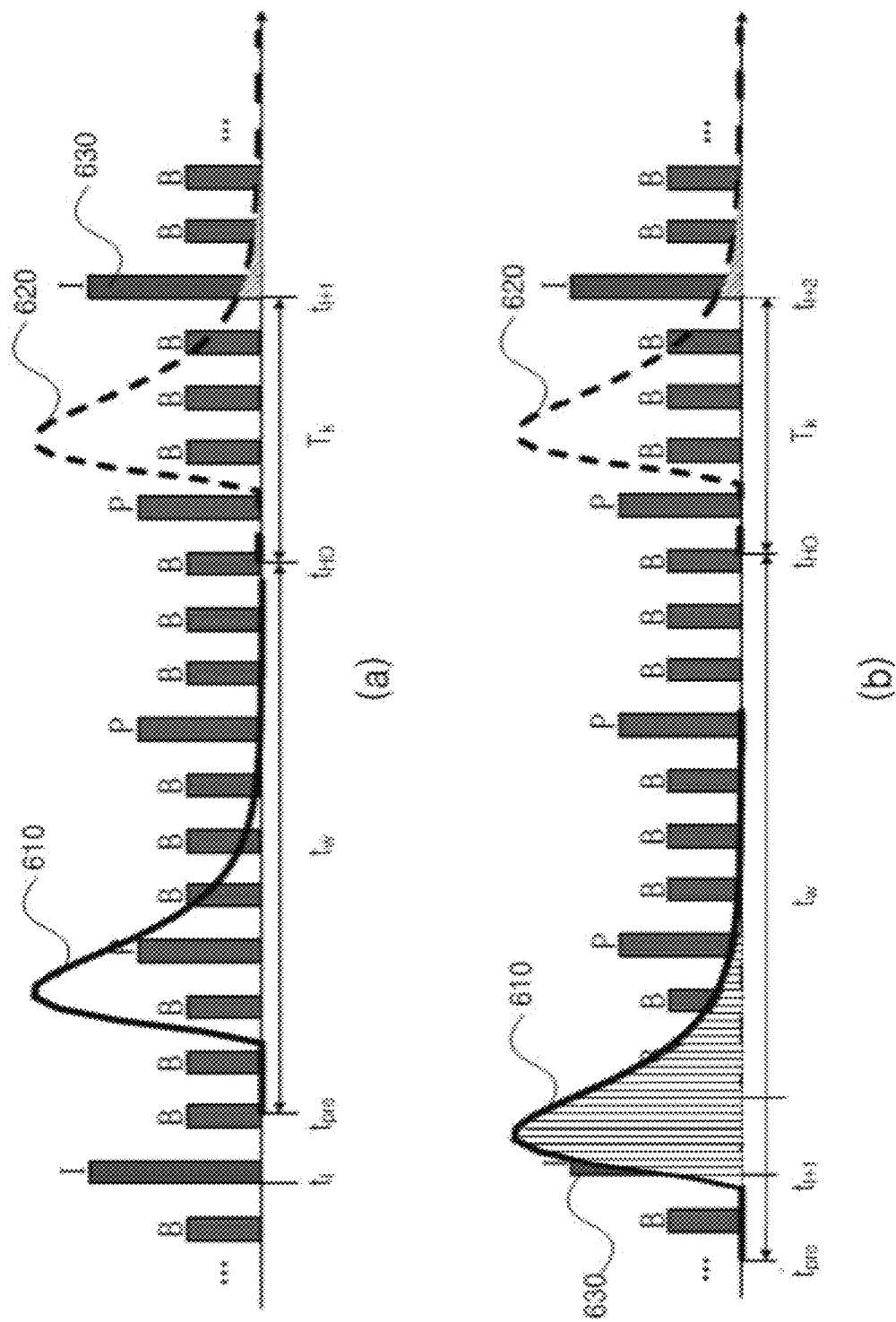
FIG. 6 is a drawing for explaining the concept of setting the designated time period (delay time) according to the size relationship between a first probability and a second probability, according to an embodiment of the present invention.

As an example, as illustrated in FIG. 6(a), in the case of the first probability (the width of the part beyond the next I frame 630 in the less area of PDF 1 (610), shaded with vertical lines; in FIG. 6(a), the first probability is close to 0%, and therefore, not indicated) being less than or equal to the second probability (the width of the part beyond the next I frame 630 in the less area of PDF 2 (620), shaded with diagonal lines), the control unit 230 can set a waiting time according to Formula 1 below:

$$T_w = t_I + T - t_{pre} - T_k \quad \text{[Formula 1]}$$

Here, $T_w$ stands for a waiting time, $t_I$ stands for the time interval between the reference time point (for example, the starting point of performing a handover) and the time point of receiving the current I frame, T stands for the time cycle of receiving the I frame, $t_{pre}$ stands for the time interval between the reference time point and the time point at which the pre-registration operation is completed and $T_k$ stands for the predicted service disruption time.

In other words, if the first probability is less than or equal to the second probability, the control unit 230 reduces the amount of loss of frames due to occurrences of service disruption time by setting a waiting time so that the detachment/attachment operation starts in the latter part of GOP of the current cycle.

As another example, as illustrated in FIG. 6(b), if the first probability is greater than the second probability, the control unit 230 can set a waiting time according to the formula below:

$$T_w = t_I + 2T - t_{pre} - T_k \quad \text{[Formula 2]}$$

In other words, if the first probability is greater than the second probability, the control unit 230 reduces the amount of loss of frames due to occurrences of service disruption time by setting a waiting time so that the detachment/attachment operation starts in the latter part of GOP of the next cycle.

Having completed the detachment/attachment according to the procedure above, the control unit 230 then performs a re-registration operation, and accordingly a vertical handover from the 3G network to the WLAN network is finally completed (VHO end).

In this manner, the mobile terminal 200 according to an embodiment of the present invention has the effect of reducing the loss of a video packet by setting a waiting time in such manner as to prevent the service disruption time from affecting the I frame of the highest priority frame to the greatest extent possible.

Figure 7:
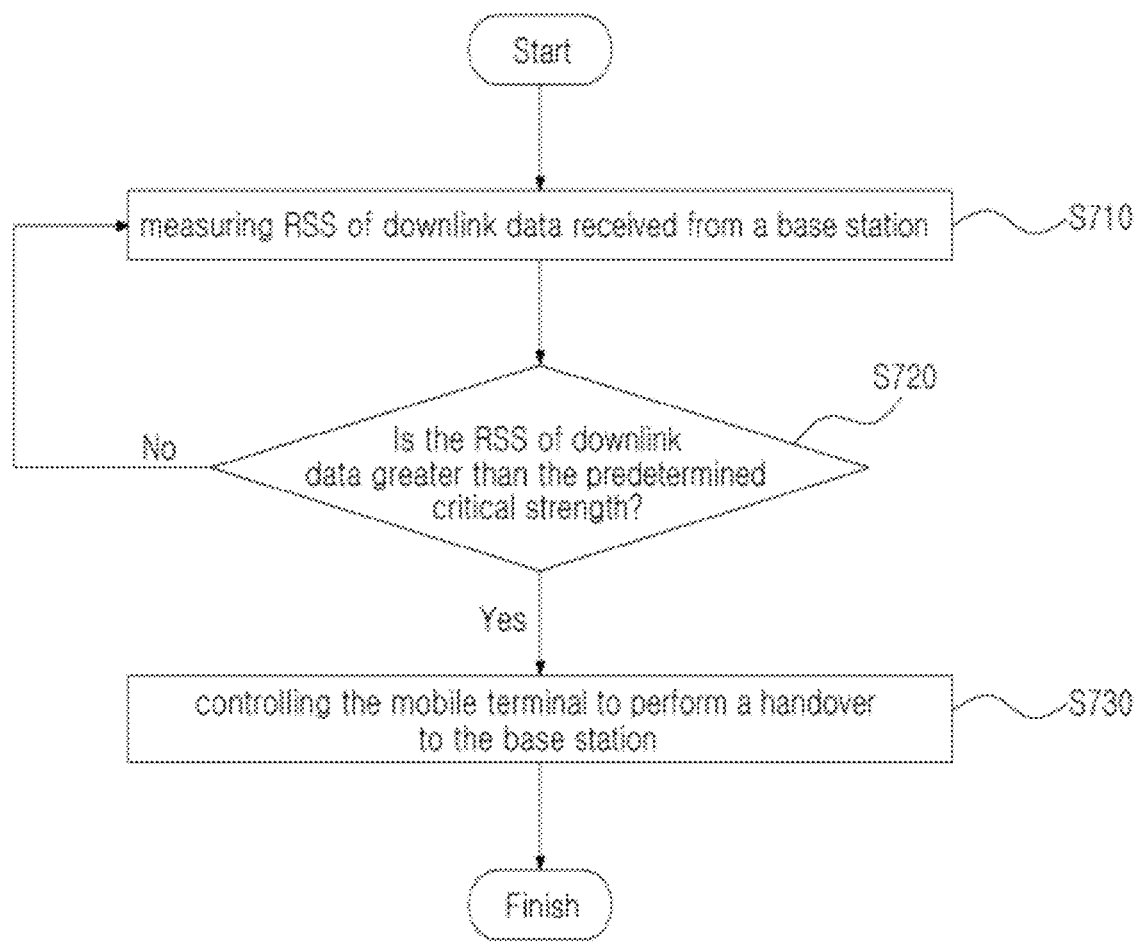
FIGS. 7 and 8 are flowcharts illustrating the overall flow of the handover method of the mobile terminal according to an embodiment of the present invention.
Figure 8:
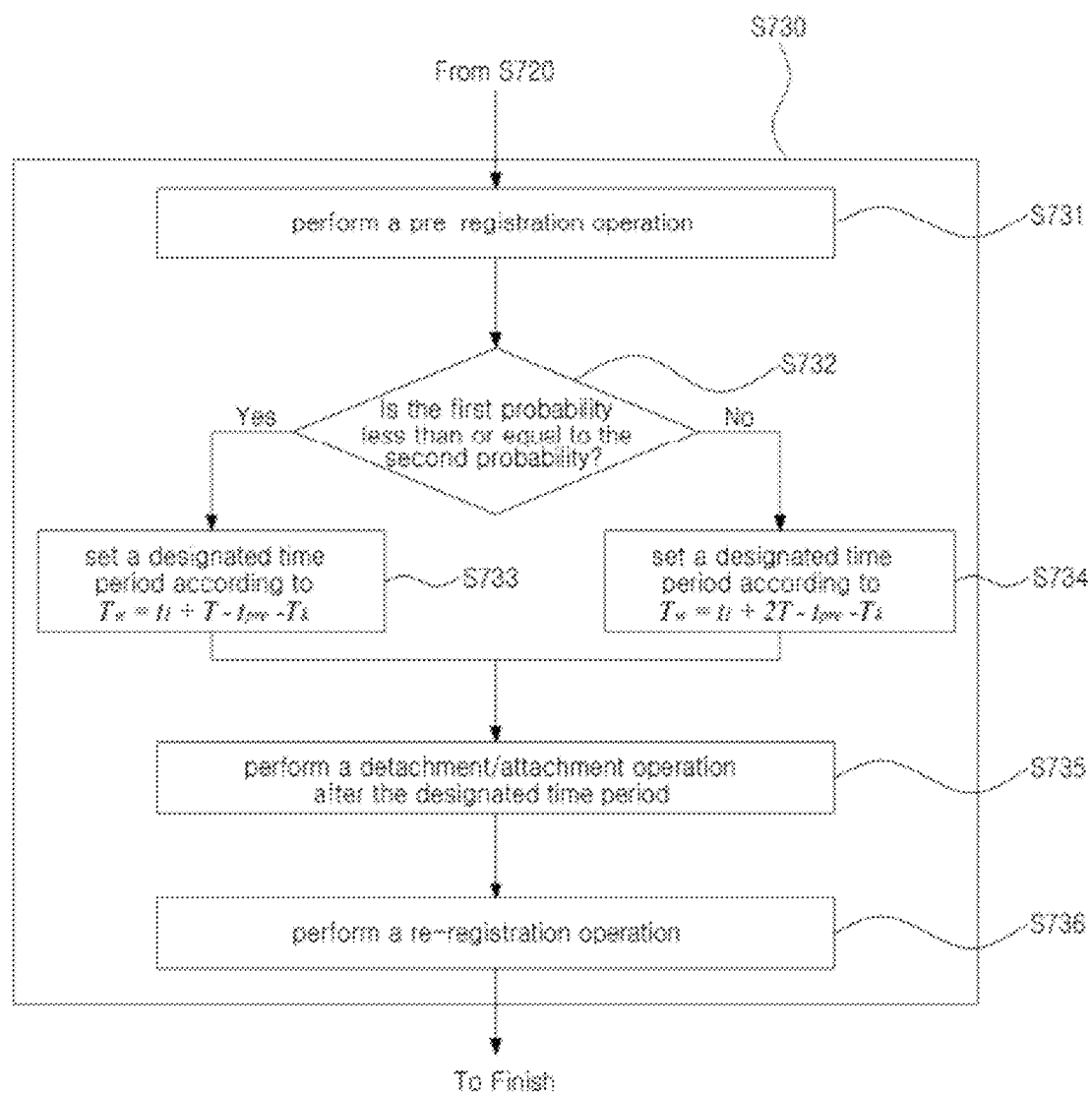

FIGS. 7 and 8 are flowcharts illustrating the overall flow of the handover method of the mobile terminal according to an embodiment of the present invention. An explanation of the operational process of each phase will be presented below with references to FIGS. 7 and 8.

First, referring to FIG. 7, the RSS of downlink data received from a base station is measured in operation S710. Here, the downlink data include multiple frames, each belonging to one of two or more frame types in a set order of priority.

In operation S720, it is determined whether the RSS of downlink data is greater than the predetermined critical strength.

If it is determined that the RSS of downlink data is less than or equal to the critical strength in operation S720, operation S710 is performed again. Conversely, if it is determined that the RSS of downlink data is greater than the critical strength in operation S720, the mobile terminal controls performance of a handover to the base station, based on the occurrence pattern of frame types of the multiple frames in operation S730.

According to an embodiment of the present invention, performing a handover is controlled by delaying the time point for performing the frame transmission/reception interruption process by a designated time period, based on the occurrence pattern of frame types in operation S730.

For example, in operation S730, the time point for receiving the highest priority frame out of the multiple frames is predicted, and the designated time period may be set so that the highest priority frame is not received during the frame transmission/reception interruption process, based on the predicted time point for receiving the highest priority frame.

A more detailed explanation of operation S730 is presented below with reference to FIG. 8.

First, a pre-registration operation is performed in operation S731.

Next, it is determined whether the first probability is less than or equal to the second probability in operation S732. Here, the first and second probabilities are the same as previously described.

If it is determined that the first probability is less than or equal the second probability in operation S732, the designated time period is set based Formula 1 above in operation S733.

Conversely, if it is determined that the first probability is greater than the second probability in operation S732, the designated time period is set based on Formula 2 above in operation S734.

Subsequently, after the designated time period set in operation S733 or S734 has passed, a detachment/attachment operation is performed in operation S735.

Lastly, a re-registration is performed in operation S736. With this, the handover of the mobile terminal is completed.

A description has been provided above on embodiments of a handover method for a mobile terminal according to an aspect of the invention. The composition of the mobile terminal described earlier with reference to FIG. 2 and FIG. 3 can also be applied to the present embodiment.

While the invention has been described above using particular items, such as specific elements, etc., and limited embodiments and drawings, these are merely provided to aid the overall understanding of the invention. The invention is not to be limited to the above embodiments, and those of ordinary skill in the art may conceive various modifications and alterations from the above disclosure. As such, the spirit of the invention is not to be defined only by the embodiments described above, and it is to be appreciated that not only the scope of claims set forth below but also their equivalents and substantially equivalent variations are encompassed within the spirit of the invention.

The invention claimed is:

1. A mobile terminal comprising:
   a communication unit configured to receive from a base station multiple frames, each belonging to one of two or more frame types in a set order of priority; and
   a control unit configured to control the mobile terminal to perform a handover to the base station, based on a pattern of frame type of the multiple frames,
   wherein the handover comprises a pre-registration operation, a detachment/attachment operation, and a re-registration operation,
   wherein the control unit controls the detachment/attachment operation to be performed after the pre-registration operation is completed and a designated time period has passed, based on the pattern of frame types;

wherein the control unit (i) predicts the time point at which a highest priority frame belonging to a frame type having the highest priority out of the multiple frames will be received after the time point at which the pre-registration operation is completed, (ii) predicts a time interval during which frame transmission/reception between the base station and the mobile terminal will be interrupted due to the handover being performed, and (iii) sets the designated time period, based on at least one of the time point at which the pre-registration operation is completed, the time point at which the highest priority frame will be received after the time point at which the pre-registration operation is completed, and the time interval during which the frame transmission/reception will be interrupted; and wherein the control unit (i) computes a first probability for receiving the highest priority frame before the detachment/attachment operation is completed, for a case of the detachment/attachment operation starting immediately after the pre-registration operation is completed, (ii) computes a second probability for receiving the highest priority frame before the detachment/attachment operation is completed, for a case of the detachment/attachment operation starting at a time point prior to the time point of receiving the highest priority frame at an interval tantamount to the time interval of the interruption of the frame transmission/reception, and (iii) sets the designated time period based on which of the first probability and the second probability is greater.

2. The mobile terminal according to claim 1, wherein the handover includes a process during which frame transmission/reception between the base station and the mobile terminal is interrupted; and wherein the control unit controls the performance of the handover by delaying a time point for performing the frame transmission/reception interruption process for a designated time period, based on the pattern of frame type.

3. The mobile terminal according to claim 2, wherein the control unit predicts the time point at which the highest priority frame belonging to a frame type having the highest priority out of the multiple frames will be received;

and sets the designated time period such that the highest priority frame is not received during the frame transmission/reception interruption process, based on the predicted time point at which the highest priority frame will be received.

4. The mobile terminal according to claim 1, wherein the control unit sets the designated time period according to a formula below, in a case of the first probability being less than or equal to the second probability:

$$T_w = t_I + T - t_{pre} - T_k,$$

where $T_w$ stands for the designated time period, $t_I$ stands for a time interval between a reference time point and the time point of receiving the highest priority frame, $T$ stands for a time cycle of receiving the highest priority frame predicted based on the pattern of the frame type, $t_{pre}$ stands for a time interval between the reference time point and a time point at which the pre-registration operation is completed, and $T_k$ stands for the time interval during which frame transmission/reception is interrupted.

5. The mobile terminal according to claim 1, wherein the control unit sets the designated time period according to a formula below, in a case of the first probability being greater than the second probability:

$$T_w = t_I + 2T - t_{pre} - T_k,$$

where $T_w$ stands for the designated time period, $t_I$ stands for a time interval between a reference time point and the time point of receiving the highest priority frame, $T$ stands for a time cycle of receiving the highest priority frame predicted based on the pattern of the frame type, $t_{pre}$ stands for a time interval between the reference time point and a time point at which the pre-registration operation is completed, and $T_k$ stands for the time interval during which frame transmission is interrupted.

6. The mobile terminal according to claim 1, wherein the control unit predicts a reception cycle of the highest priority frame based on the pattern of frame type, and predicts the time point at which the highest priority frame will be received after the time point at which the pre-registration operation is completed, by using the time point at which the highest priority frame is received before the time point at which the pre-registration operation is completed and the reception cycle of the highest priority frame.

7. The mobile terminal according to claim 1, wherein the multiple frames include an I frame, a P frame, and a B frame, comprising video data;

and the highest priority frame corresponds to the I frame.

8. A handover method for a mobile terminal, the method comprising the steps of:

measuring a reception strength of data received from a base station, the data including multiple frames each belonging to one of two or more frame types in a set order of priority; and controlling the mobile terminal to perform a handover to the base station based on the pattern of frame types of the multiple frames, wherein the handover comprises a pre-registration operation, a detachment/attachment operation, and a re-registration operation, wherein the step of controlling comprises controlling the detachment/attachment operation to be performed after the pre-registration operation is completed and a designated time period has passed, based on the pattern of frame types, wherein the step of controlling comprises: (i) predicting the time point at which a highest priority frame belonging to a frame type having the highest priority out of the multiple frames will be received after the time point at which the pre-registration operation is completed, (ii) predicting a time interval during which frame transmission/reception between the base station and the mobile terminal will be interrupted due to the handover being performed, and (iii) setting the designated time period, based on at least one of the time point at which the pre-registration operation is completed, the time point at which the highest priority frame will be received after the time point at which the pre-registration operation is completed, and the time interval during which the frame transmission/reception will be interrupted; and wherein the step of controlling comprises: (i) computing a first probability for receiving the highest priority frame before the detachment/attachment operation is completed, for a case of the detachment/attachment operation starting immediately after the pre-registration operation is completed, (ii) computing a second probability for receiving the highest priority frame before the detachment/attachment operation is completed, for a case of the detachment/attachment operation starting at a time point prior to the time point of receiving the highest priority frame at an interval tantamount to the time interval of the interruption of the frame transmission/reception, and (iii) setting the designated time period based on which of the first probability and the second probability is greater.

9. The method according to claim 8, wherein the handover includes a process during which frame transmission/reception between the base station and the mobile terminal is interrupted, and wherein the step of controlling comprises performing the handover by delaying a time point of performing the process during which the frame transmission/reception is interrupted by a designated time period based on the pattern of frame types.

10. The method according to claim 9, wherein the step of controlling comprises:

predicting the time point at which the highest priority frame belonging to a frame type having the highest priority out of the multiple frames will be received; and setting the designated time period such that the highest priority frame is not received during the process of frame transmission/reception interruption based on the predicted time point of receiving the highest priority frame.

\* \* \* \* \*